US008432582B2

(12) United States Patent
Zhang et al.

(10) Patent No.: US 8,432,582 B2
(45) Date of Patent: Apr. 30, 2013

(54) UNIFORMITY COMPENSATION IN HALFTONED IMAGES

(75) Inventors: Yeqing Zhang, Penfield, NY (US); Robert Paul Loce, Webster, NY (US); Beilei Xu, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 2771 days.

(21) Appl. No.: 10/923,116

(22) Filed: Aug. 20, 2004

(65) Prior Publication Data
US 2006/0077489 A1   Apr. 13, 2006

(51) Int. Cl.
G06K 15/00   (2006.01)
H04N 1/40   (2006.01)

(52) U.S. Cl.
USPC ........... 358/3.09; 358/1.9; 358/3.06; 358/3.1; 358/3.12; 358/3.21; 358/3.24; 358/3.26; 358/534

(58) Field of Classification Search .................... 358/1.9, 358/3.01, 3.03, 3.04, 3.05, 3.18, 3.21, 3.22, 358/3.23, 504, 518, 519, 520, 534; 382/252, 382/253
See application file for complete search history.

(56) References Cited

U.S. PATENT DOCUMENTS

| | | | |
|---|---|---|---|
| 5,077,812 A | 12/1991 | Kanno et al. | |
| 5,204,753 A * | 4/1993 | Tai | 358/3.24 |
| 5,260,807 A * | 11/1993 | Tai | 358/3.21 |
| 5,543,935 A * | 8/1996 | Harrington | 358/3.07 |
| 5,635,967 A * | 6/1997 | Klassen | 347/43 |
| 5,649,073 A * | 7/1997 | Knox et al. | 358/1.9 |
| 5,694,224 A * | 12/1997 | Tai | 358/3.01 |
| 5,749,020 A | 5/1998 | Mestha et al. | |
| 5,768,425 A * | 6/1998 | Praveen et al. | 358/3.22 |
| 5,768,432 A | 6/1998 | Schweid | |
| 5,777,656 A * | 7/1998 | Henderson | 347/251 |
| 5,818,604 A * | 10/1998 | Delabastita et al. | 358/3.19 |
| 5,825,394 A | 10/1998 | Gilbert et al. | |
| 5,854,882 A * | 12/1998 | Wang | 358/1.9 |
| 5,943,477 A * | 8/1999 | Rao et al. | 358/1.8 |
| 5,956,469 A * | 9/1999 | Liu et al. | 358/1.9 |
| 5,963,244 A | 10/1999 | Mestha et al. | |
| 5,995,714 A * | 11/1999 | Hadley et al. | 358/1.9 |
| 6,021,285 A | 2/2000 | Mestha et al. | |
| 6,512,597 B1 * | 1/2003 | Cooper et al. | 358/1.9 |
| 6,545,773 B1 | 4/2003 | Hudson | |
| 6,603,575 B2 | 8/2003 | Schweid | |

(Continued)

FOREIGN PATENT DOCUMENTS

| | | | |
|---|---|---|---|
| EP | 0658039 B1 | 5/1999 | |
| EP | 0658044 B1 | 7/1999 | |
| GB | 2290190 A | 12/1995 | |

*Primary Examiner* — Richard Zhu
(74) *Attorney, Agent, or Firm* — Fay Sharpe LLP

(57) ABSTRACT

Compensation for rendering device non-uniformities is provided for halftoned images. A spatially dependent tone reproduction curve (TRC) provides compensation values. Pixel location information is used to access TRC values. For example, the values are modification values. The modification values are added to the pixel values to generate combined values. Quantization is applied to the combined values to prepare compensated image data for rendering. For example, Rank Ordered Error Diffusion is applied to the combined values. The combined values may include diffused error from previously processed pixels. Gray values may be estimated for the respective pixels. The estimated gray values may be used to access compensation information from a TRC that is both spatially and gray value dependent. Mathematical basis decomposition is used to reduce TRC memory requirements. For example, Discrete Cosine Transformation, Singular Value Decomposition or Principal Component Analysis is used to determine a compact form for the TRC.

24 Claims, 12 Drawing Sheets

U.S. PATENT DOCUMENTS

| | | |
|---|---|---|
| 6,629,746 B2 * | 10/2003 | Waldner et al. ................. 347/19 |
| 6,633,411 B1 | 10/2003 | Rao et al. |
| 6,636,628 B1 | 10/2003 | Wang et al. |
| 6,646,762 B1 * | 11/2003 | Balasubramanian et al. . 358/1.9 |
| 6,704,123 B1 * | 3/2004 | Av-Shalom et al. ......... 358/2.99 |
| 6,717,700 B1 * | 4/2004 | Sanderson et al. ........... 358/3.21 |
| 6,760,056 B2 | 7/2004 | Klassen et al. |
| 6,792,160 B2 * | 9/2004 | Shaw et al. ................... 382/272 |
| 7,009,736 B2 * | 3/2006 | Thakur ........................ 358/3.06 |
| 7,031,025 B1 * | 4/2006 | He et al. ...................... 358/3.09 |
| 7,079,289 B2 * | 7/2006 | Loce et al. ................... 358/3.03 |
| 7,158,263 B2 * | 1/2007 | Allen et al. .................. 358/3.13 |
| 2002/0075379 A1 | 6/2002 | Klassen et al. |
| 2002/0085248 A1 | 7/2002 | Xu et al. |
| 2002/0186225 A1 | 12/2002 | Hsu et al. |
| 2003/0021488 A1 * | 1/2003 | Shaw et al. ................... 382/260 |
| 2003/0090729 A1 * | 5/2003 | Loce et al. ................... 358/3.06 |
| 2003/0174104 A1 | 9/2003 | Kao et al. |
| 2003/0218780 A1 | 11/2003 | Braun et al. |
| 2004/0012817 A1 | 1/2004 | Brewington et al. |
| 2004/0032600 A1 | 2/2004 | Burns et al. |

\* cited by examiner

FIG. 9

Pixel Columns Across Page $$\mathbf{Y} = \begin{bmatrix} y_{1,1} & y_{2,1} & \cdots & y_{N,1} \\ y_{1,2} & y_{2,2} & \cdots & y_{N,2} \\ \vdots & \vdots & & \vdots \\ y_{1,256} & y_{2,256} & \cdots & y_{N,256} \end{bmatrix}$$

910

$$\mathbf{Y}' = \begin{bmatrix} y_{1,1} & y_{2,1} & \cdots & y_{N,1} \\ y_{1,2} & y_{2,2} & \cdots & y_{N,2} \\ \vdots & \vdots & \cdots & \vdots \\ y_{1,256} & y_{2,256} & \cdots & y_{N,256} \end{bmatrix} - \begin{bmatrix} y_1^A & y_1^A & \cdots & y_1^A \\ y_2^A & y_2^A & \cdots & y_2^A \\ \vdots & \vdots & \cdots & \vdots \\ y_{256}^A & y_{256}^A & \cdots & y_{256}^A \end{bmatrix} = \begin{bmatrix} y'_{1,1} & y'_{2,1} & \cdots & y'_{N,1} \\ y'_{1,2} & y'_{2,2} & \cdots & y'_{N,2} \\ \vdots & \vdots & \cdots & \vdots \\ y'_{1,256} & y'_{2,256} & \cdots & y'_{N,256} \end{bmatrix}$$

$$\mathbf{Y}^A = \begin{bmatrix} y_1^A \\ y_2^A \\ \vdots \\ y_{256}^A \end{bmatrix} \; 1010$$

$$y_{out}(y_{in};p) = y^A_{in} + u_{1,y_{in}} w_{p,1} + u_{2,y_{in}} w_{p,2}$$

- 1244, 1230: $y_{out}(y_{in};p)$
- 1240, 1224: $y^A_{in}$ — Mean Compensation TRC Value
- 1214: $u_{1,y_{in}}$ — Value of Basis Vector 1 for Input Value $y_{in}$
- 1218: $w_{p,1}$ — Weight of Basis Vector1 for Pixel Column $p$
- 1216: $u_{2,y_{in}}$ — Value of Basis Vector 2 for Input Value $y_{in}$
- 1220: $w_{p,2}$ — Weight of Basis Vector 2 for Pixel Column $p$

*FIG. 12*

UNIFORMITY COMPENSATION IN HALFTONED IMAGES

BACKGROUND

The present exemplary embodiment relates to methods and systems for improving image uniformity in image rendering systems. It finds particular application in conjunction with document processing systems, and will be described with particular reference thereto. However, it is to be appreciated that some embodiments are amenable to other applications.

Image uniformity is a desired goal in most, if not all, image rendering processes. That is, it is desirable for an image to appear the same no matter where it is placed on an image rendering surface. Furthermore, portions of an image that are meant to have the same lightness or hue should appear to have the same lightness or hue throughout a rendered image. However, imperfections in image rendering systems or processes can lead to image non-uniformities.

For example, in some electrophotographic rendering devices, variation in spot size, as a laser beam, of a raster output scanner, is directed across an imaging surface, such as a photoreceptor or photoconductive substrate, can lead to imaging artifacts in a rendered output image. Such spot size variation can be caused, for example, by variations in focus (caused by imperfection in lenses), variation in the incident angle of the beam on the photoreceptor, variation in beam path length as it is swept across the photoreceptor or photoconductor in a process direction or by other factors. Where raster output scanners are based on light emitting diodes, variations in LED efficiency and/or focus can also lead to non-uniformities. Other factors that can lead to image non-uniformities include, but are not limited to, imperfections, such as scratches in the photoreceptor or photoconductor, and Hybrid Scavengeless Development (HSD) wire variations, due to wire age and/or imaging history.

One method to improve rendered image uniformity is to improve related system components. For example, lensing systems might be improved and photoreceptors might be made with increased durability. However, system components manufactured to higher or more stringent tolerances can be expensive to design and produce.

An alternative or complementary solution to rendered image non-uniformities is to adjust image data to compensate for rendering device non-uniformities prior to rendering. For example, where it is known that a portion of an image would otherwise be rendered lighter than adjacent portions of the image, or lighter than desired, image data can be modified so that the combined effect of the modification and the lightening characteristics of the rendering device are to produce the image portion at the same lightness level as the adjacent portions, or as desired.

For example, where image data is available in a contone format, Tone Reproduction Curves (TRCs) can be used to adjust pixel values to compensate for the characteristics of a particular marking engine. For instance, a diagnostic or calibration image is rendered by a marking engine. A sensor is used to measure or analyze an aspect of the rendered image. For example, the image includes portions that are meant to be rendered to have the same lightness or shade of gray. The lightness or shade of gray of the rendered image is measured. The measurements may be used to generate an Engine Response Curve (ERC). The Engine Response Curve may describe a response, such as an average response, over the entire area of the diagnostic or calibration image. Additionally, or alternatively, Engine Response Curves may be generated for a specific spatial location or range of locations. For instance, an image space may be considered to be made up of a grid of pixel locations. A pixel location may be identified by an intersection of a row or a column. The physical design of a rendering system may dictate that the Engine Response Curve for pixels located in a given row or a given column are similar. Therefore, an Engine Response Curve may be determined for each row or column in the image space.

For example, where a rendering device includes an LED bar for generating a latent image on a photoreceptor, a particular LED in the bar may be associated with a particular portion of the image space. The efficiency of the LED may be a significant factor in the ERC for that portion of the image space. For instance, the portion of image space appears as a strip (row or column or plurality of rows or plurality of columns) including all those pixel locations having a level of exposure determined by light emitted from the particular LED. Therefore, it may be appropriate for the pixel locations associated with that portion of the image space to be associated with the same spatially dependent ERC.

On the other hand, it may be appropriate for each pixel location, or small cluster of pixel locations, in an image space to be associated with a particular ERC. For instance, an engine response for a small cluster of pixel locations in an image space may be a function of both an LED efficiency and a scratch or other imperfection at a particular point or region on a photoreceptor belt or drum. Some pixel locations associated with the particular LED may be unaffected by the imperfection in the photoreceptor. Those portions may be associated with a first ERC, while the pixel locations associated with the photoreceptor imperfection may be associated with a second engine response curve.

The phrase—Engine Response Curve—(or ERC) may be used to refer to a general engine response curve that is applicable to an entire rendered image space, such as, an average Engine Response Curve. Additionally, or alternatively, the phrase—Engine Response Curve—may be used to refer to a collection of regional Engine Response Curves, wherein each regional Engine Response Curve describes an engine response of an imaging system at a respective particular portion of rendered image space. Furthermore, the phrase—Engine Response Curve—may be used to refer to an individual regional Engine Response Curve associated with a particular row, column, cluster or individual pixel location in a rendered image space. Similarly, the phrase—compensating Tone Reproduction Curve—(or TRC) can be used to refer to a curve, collection or set of curves or an individual member of a collection or set of curves that includes information for compensating for imperfections or departures from the ideal, in an Engine Response Curve, whether the Engine Response Curve is an average or overall Engine Response Curve, a collection or set of regional Engine Response Curves or an Engine Response Curve related to an individual pixel location within a rendered image space.

Engine Response Curves (ERCs) and Tone Reproduction Curves (TRCs) are referred to as curves because the information they contain, or are associated with, may sometimes be displayed or discussed as a plot of datapoints. However, information related to both ERCs and compensating TRCs may be stored or manipulated as tables of data, sets of coefficients and/or constants associated with equations, or by other means, as may be convenient.

As indicated above, compensating TRCs are useful for compensating for rendered image non-uniformities where image pixels describe input or desired colors or shades of gray with a relatively fine resolution. For example, compensating tone reproduction curves are useful where image pixels describe an input or desired color with one or more values in a relatively broad range of, for example, 0 to 255. Such pixels are said to describe an input or desired color with contone values. In such systems, one may select an appropriate compensating TRC for a pixel location in rendered image space based on a contone value of the input pixel and look up and/or calculate a compensated contone value based on the selected compensating tone reproduction curve.

However, image descriptions are not always available in terms of contone values. Sometimes, image descriptions are only available in what is referred to as a binary or quantized format. Binary image description formats are useful because many marking engines are limited to placing a mark or not placing a mark at any given pixel location. Binary image formats describe an image in terms of placing a mark or not placing a mark. Even where pixels are referred to as—high addressable—and describe pixels with more than the two (on, off) states of a binary format ultimately, they describe binary states of a cluster of spots wherein each member of the cluster is either marked or unmarked.

These quantized or binary image descriptions are often generated by applying a halftoning or quantization process to an image described in terms of contone values. Therefore, we refer to all binary or quantized image descriptions as halftoned.

A received halftoned image or image description may be the direct or indirect result of a rasterizing image process. For example, a rendered image may be scanned. Even though the scanning process generates contone values, the scanned image data is binary or quantized in nature because the scanned image data will contain very few different quantization levels. For example, the quantization levels of the scanned image data will be near the extremes of the available contone range. For instance, the scanned image data of a halftoned or a rasterized image will contain only values near 0 and 255 (in an 8-bit system). All images having these binary or nearly binary or quantized characteristics are referred to herein as halftoned images. The limited resolution with which pixels in a halftoned image describe desired lightness levels or shades of gray limits the usefulness of compensating tone reproduction curves for generating compensated values. For example, where a compensating tone reproduction curve may be used to determined that a compensated value for a shade of gray represented by the number 100 might be a value of 103, a similar tone reproduction curve could not be used to determine a corrected value where an input value must select an output value from an available range of values of only 0 and 1, on and off, or full scale dark and full scale light. Therefore, it has not been possible or practical to use compensating Tone Reproduction Curves to compensate halftoned images for image non-uniformities such as streaks, banding and mottling.

Nevertheless, there has been a desire to compensate for system imperfections, or variations from the ideal, in systems where image data is only available in a halftoned form.

BRIEF DESCRIPTION

A method for compensating for a spatial non-uniformity in an image rendering device includes predetermining a spatially dependent compensating tone reproduction curve for the rendering device, receiving a halftoned image including a plurality of respective halftone pixels having respective halftone pixel values, the respective halftone pixels being associated with respective halftone pixel positions in the image and determining respective compensated values for respective halftone pixels based on the respective halftone pixel positions, the spatially dependent compensating tone reproduction curve and associated respective halftone pixel values.

Some embodiments include estimating respective gray values associated with respective halftone pixels. In these embodiments, determining respective compensated values for respective halftone pixels can include determining respective compensated values for respective halftone pixels based on the respective halftone pixel positions, the respective estimated gray values, the spatially dependent compensating tone reproduction curve and the respective halftone pixel values.

Predetermining the spatially dependent compensating tone reproduction curve can include performing mathematical basis decomposition on at least one of a plurality of respective compensating tone reproduction curves and/or a plurality of engine response curves, thereby determining respective basis vectors and respective vector weights representative of at least one of the plurality of respective compensating tone reproduction curves and the plurality of engine response curves and generating the spatially dependent compensating tone reproduction curve from the respective basis vectors and respective vector weights.

Performing mathematical basis decomposition can include performing at least one of discrete cosine transformation, singular value decomposition and principal component analysis.

Determining respective compensated values for respective halftone pixels can include determining respective modification values for respective halftone pixels based on the respective halftone pixel positions, the respective estimated gray values, and the spatially dependent compensating tone reproduction curve and performing error diffusion based on the respective halftone pixel values of the received halftoned image and the respective modification values. For example, rank ordered error diffusion can be performed.

BRIEF DESCRIPTION OF THE DRAWINGS

FIG. 9 illustrates a compensating Tone Reproduction Curve in the form of a matrix.

FIG. 10 illustrates a matrix equation for determining a variation of the data in the compensating Tone Reproduction Curve of FIG. 9 from a mean or reference Tone Reproduction Curve.

FIG. 12 illustrates a resulting compensating Tone Reproduction Curve equation.

DETAILED DESCRIPTION

Imperfections or non-uniformities in rendering systems or rendering system components, can lead to non-uniformities in rendered images. As described above, within a single electrophotographic marking engine, such non-uniformities can be caused by lens imperfections, component age and component wear. In other marking technologies, image non-uniformities may be caused by other factors. For example, in some ink jet based marking engines, the ink jet head scans across a sheet in both a forward and reverse direction. For increased rendering speed, ink is laid down during both the forward and reverse passes.

This often requires that the order in which the inks are applied to the sheet changes between the forward and reverse pass. The order in which inks are laid down affects a perceived color. Therefore, image portions rendered during forward passes can vary in appearance from those image portions rendered during reverse passes.

Where a rendered image space extends across multiple print engines, image non-uniformity can be further caused by differences in marking engine design, component selection, engineering tolerances and other factors including variations in temperatures and humidities between locations of the plurality of print engines. Non-uniformity can also extend across points in time.

Figure 1:
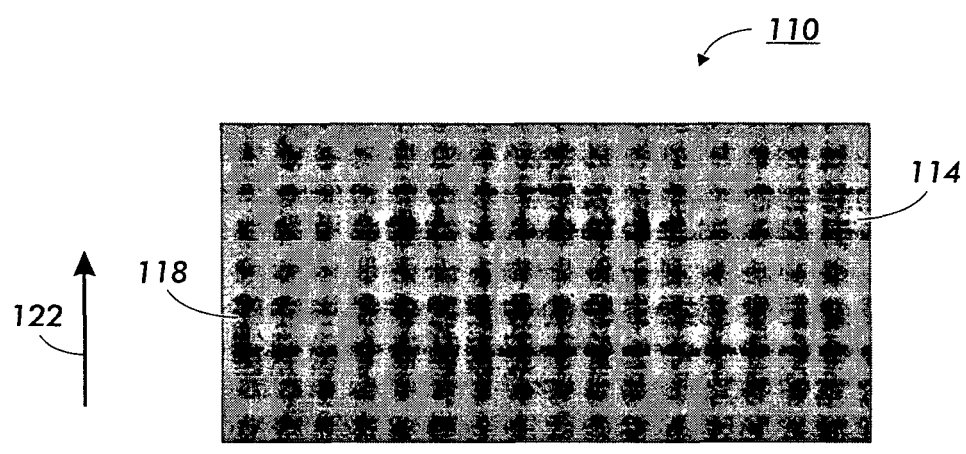
FIG. 1 is a single contone image patch that has been rendered by a device exhibiting image non-uniformities.

FIG. 1 depicts an image or image portion that was intended to be rendered uniformly. That is, an input or desired image related to the image portion 110 was a uniform patch having the same lightness, shade of gray, hue or density of colorant across the entire rendered image space. However, the rendering device that produced the image portion 110 has a spatially dependent engine response curve. That is, for a given input or target shade of gray, the marking engine reacts differently depending where in a rendered image space a subject pixel is located. This leads to imaging artifacts such as streaks or bands 114 of relative light colorant density and streaks or bands 118 of relatively dark or heavy colorant density.

When a rendering device produces such image non-uniformities in two or more directions through rendered image space, it is often referred to as mottling.

Methods and systems for compensating for such non-uniformities will be described in terms of compensating for streaks. However, the methods and systems described herein are also applicable to compensating for other kinds of image non-uniformities, including, but not limited to, banding, mottling and rendering device to rendering device variations, as well as variations that occur over time. Additionally, the phrase—shade of gray—is meant to refer to a level of lightness and is not meant to be limited to only neutral colors. The methods and systems described herein are equally applicable to color separations associated with color images and color image processing.

Figure 2:
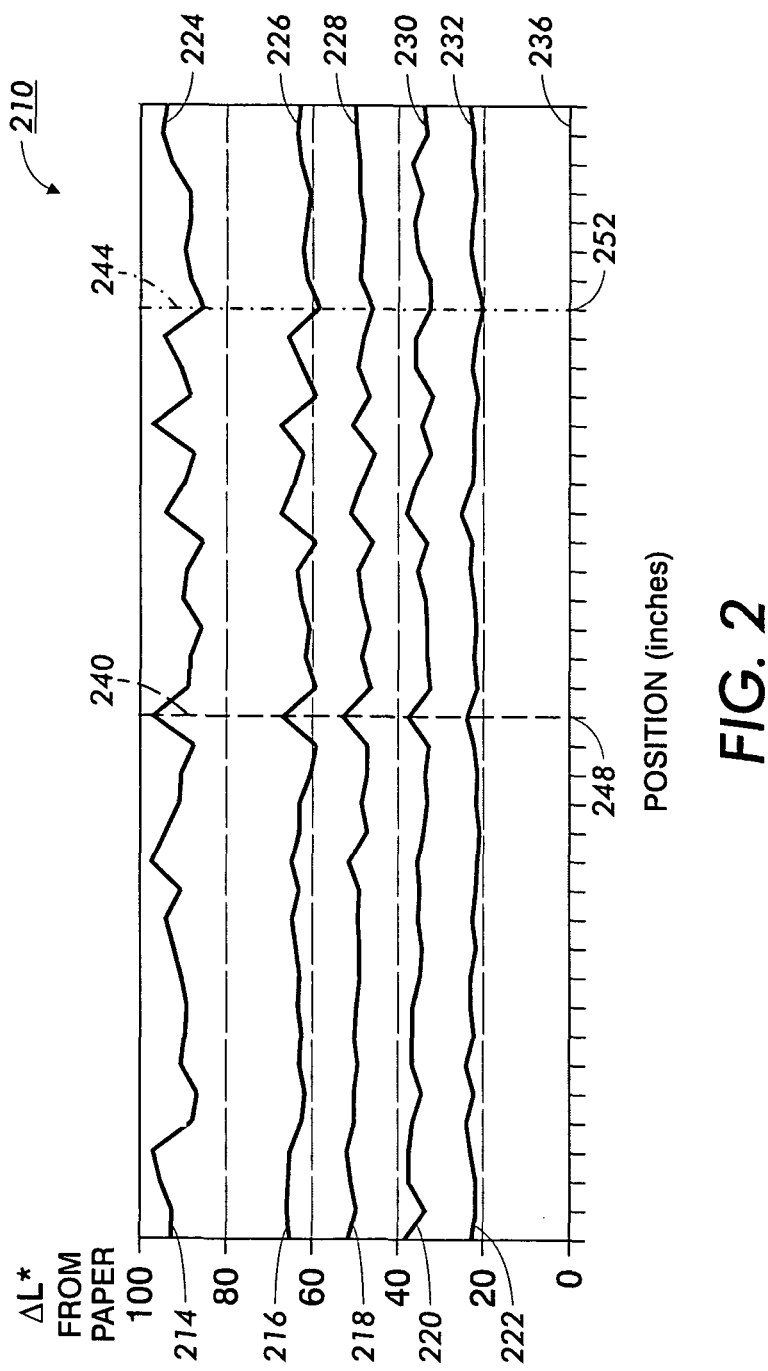
FIG. 2 is a plot of an engine response to five uniform input patches.

Referring to FIG. 2, image patches similar to the image portion 110 can be rendered and examined with a lightness or reflectance sensor. For example, five different patches are rendered and measured. Each individual patch is meant to have a uniform appearance related to a particular contone value. For example, the image patches are associated with input or desired contone levels of 30, 70, 130, 170 and 240 respectively. A marking engine that rendered the patches exhibits non-uniform rendering characteristics. A sensor is used to examine the patches. For example, the sensor reports levels of gray or colorant density in terms of lightness or difference in lightness from that of an unmarked sheet ($\Delta L^*$). The sensor takes readings from a plurality of positions in each of the patches. For example, the sensor scans the patches in a cross-process direction (e.g., 122). The sensor readings are presented in a graph 210. For each level 214, 216, 218, 220, 222, respective lightness readings 224, 226, 228, 230, 232, are plotted as a function of position 236. It is to be noted that the plots 224-232 may show some common features. For example, all of the plots 224-232 may indicate a local dark region 240 and/or a local light region 244 at respective common positions 248, 252. However, other aspects of the plots may be different. For example, one plot (e.g., 224), associated with a first contone level, may show increased variation as compared to another plot (e.g., 232), associated with a second contone level.

Figure 3:
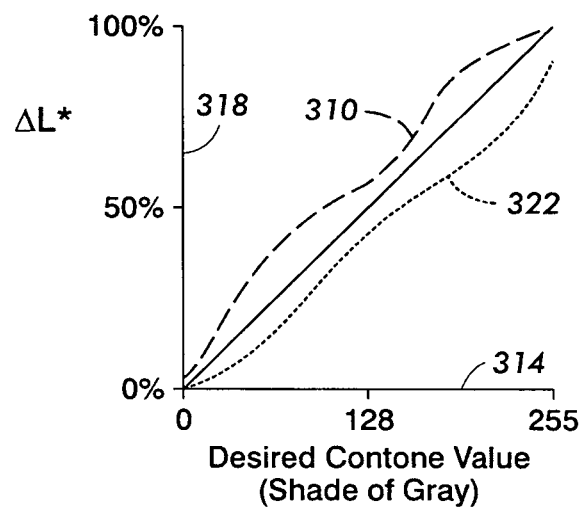
FIG. 3 is a plot of Engine Response Curves at different positions in rendered image space.

Referring to FIG. 3, if additional patches are rendered and examined, an ERC can be determined for each position in the rendered image space. For example, a dark engine response curve 310 may be associated with the position 248 of the local dark region 240. For a given position, such an ERC relates an input or desired lightness or contone value 314 to an actual lightness or luminosity 318. The marking engine under examination exhibits non-uniformities. Therefore, at a different position in rendered image space, the engine response curve may be determined to be different. For example, a light engine response curve 322 may be associated with the position 252 and the local light region 244. For each position of interest in rendered image space, an ERC (e.g., 310, 322) can be determined. For each determined ERC (e.g. 310, 322), a compensating TRC can be generated (e.g., 410,422). Each compensating TRC relates a desired shade of gray, luminance or colorant density, described in terms of a desired or input contone value 430, to a compensated contone value 434. The compensated contone value 434 is used in place of the input contone value 430 indicating the desired shade of gray. For example, where an ERC indicates that the engine produces lighter shades that one would otherwise desire, the compensated contone value would represent a request for extra darkness.

However, as indicated above, desired shades of gray or input contone values are not always available. Where image data is only available in a quantized format, compensating TRCs are not practical. Compensated values would have to be quantized as well. The quantization error associated with a quantized compensation value could increase overall error rather than decrease it.

Figure 5:
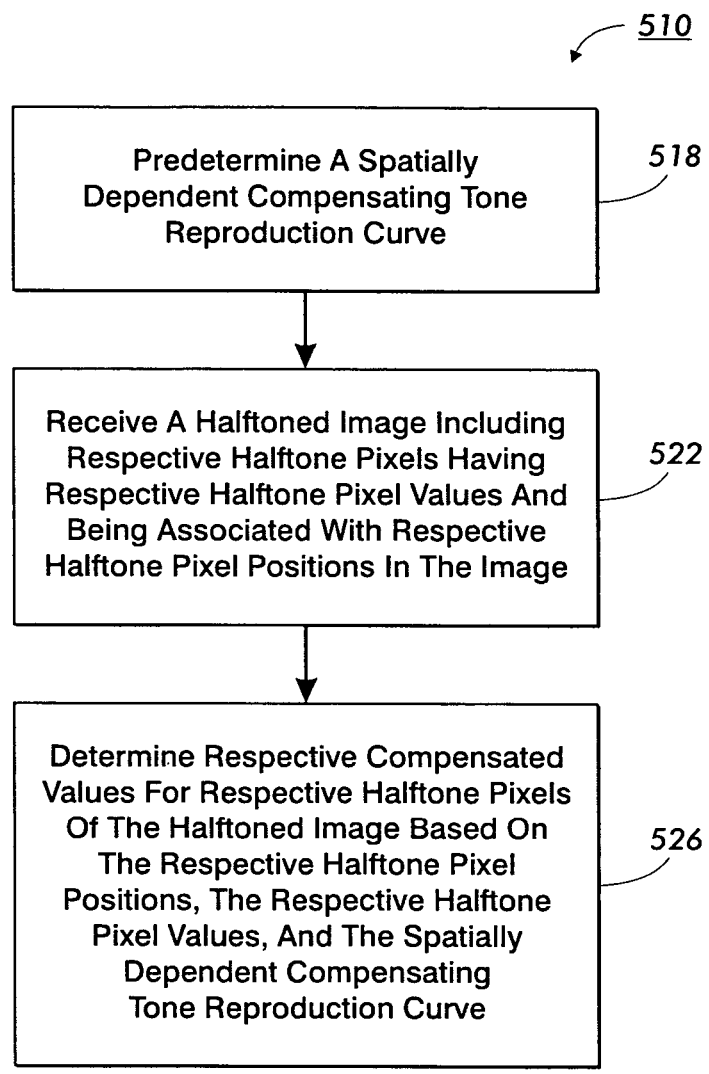
FIG. 5 is a flow chart outlining a first method for compensating for non-uniformities in an image rendering system.

Referring to FIG. 5, a method 510 for compensating for a spatial non-uniformity in an image rendering device, where a desired image is described only in a halftoned or quantized format, includes predetermining 518 a spatially dependent compensating Tone Reproduction Curve (TRC), receiving 522 a halftoned image and determining 526 respective compensated values for respective halftone pixels of the halftoned image based on the respective halftone pixel positions, the respective halftone pixel values and the spatially dependent compensating tone reproduction curve.

Predetermining 518 a spatially dependent compensating tone reproduction curve can be accomplished through a wide variety of methods. For example, a desired level of gray or contone value may be selected. An image or target patch at that desired level of gray or contone value is quantized for rendering and the marking engine or engines of interest render an image according to the quantizing. A sensor is used to evaluate the uniformity of the rendered image. An initial modification value is selected for each portion of the image that is measured to be at a level of gray that is different from the desired level of gray. The modification values are applied to pixel values of the quantized patch image.

For example, the quantized patch image is binary in nature having pixel values only of 0 and 1. However, for purposes of calculation, the quantized image is normalized to a wider scale. For example, binary pixel values of 1 are normalized to a value of 255. Binary pixel values of 0 are normalized to a value of 0. The modification values are applied to the appropriate normalized pixel values. For example, addition can be used to add lightness/darkness to produce modified/compensated pixel values and error diffusion is used to quantize the modified/compensated pixel values, to regions of the quantized patch that were measure to vary from the desired shade of gray. Rank Ordered Error Diffusion (ROED) beneficially clusters lightness and darkness to respective light and dark portions of the quantized image.

A new image based on the modified quantized image data is rendered and the sensor is again used to evaluate image uniformity. For portions of the new rendered image that varied from the desired shade of gray in the original rendered image, but do not vary from the desired shade of gray in the newly rendered image, the initial modification value is recorded in association with the appropriate pixel positions. For portions of the newly rendered image that still vary from the desired shade of gray, a new modification value is selected. The process described above is repeated until all portions of a rendered modified patch image are measured to be within a desired tolerance or range of the desired shade of gray, and all the appropriate modification values have been recorded in association with the appropriate pixel positions.

Alternatively, more analytical approaches may be taken. For example, as described above in reference to FIG. 2, a spatially dependent Engine Response Curve may be determined for a representative shade of gray or contone value (e.g., 218). Information from that representative ERC may be combined with information regarding the image rendering system in question to calculate or determine an appropriate spatially dependent compensating TRC. For example, information from the uncompensated ERC may be combined with information regarding quantization techniques, colorant characteristics, and/or other information regarding system behavior in order to predetermined 518 appropriate modification values for a compensating TRC.

Receiving 522 a halftoned image can include receiving image data including pixels having respective pixel values and being associated with respective halftone pixel positions in the image. For instance, a halftoned image can include binary image data including only two pixel values (e.g., 0, 1) indicating where a rendering device or marking engine should place marks or should not place marks. Halftoned image data may also be received in a format applicable to high addressability. While high addressable pixels may be considered to have more than the two binary states, this is just a more compact means for directing the placement of marks. In this regard, ultimately, halftoned image data in a high addressable format is binary in nature.

Halftoned image data can also be received 522 as the result of a scanning process. For example, a halftoned image may be placed on a scanner platen and an image sensor used to record image data. For instance, a scan bar including discrete image sensing elements, is moved across the face of the image. The image sensing elements report light reflectance information in association with position information. The light reflectance information is in a continuous tone format. That is, for each scanned pixel position, a light reflectance reading is reported as one of a large number of levels of light reflectance. For example, a light reflectance reading may be at one of 256 levels (e.g., 0-255, in an 8-bit system). If the halftone screen of the image placed on the platen is perfectly aligned and at the same frequency as the placement of photosensors on the scan bar or other imaging element, then the photosensors may report saturated lightness values. For example, the scan bar elements may report only values of 0 and 255.

However, it is more likely that the dot frequencies in the halftoned image are different from the frequencies associated with the scan bar. Additionally, it is likely that the spots in the image will not be precisely aligned with the scanning elements. For the foregoing reasons, the scanning process is likely to result in a description of the scanned image that includes a number of shades of gray. For example, the image may be described in terms of values near saturation (e.g., 250 instead of 255 and 7 instead of 0). Additionally, the image may include some midtone values where, for example, a sensing element of the scan bar only partially overlaps a dot or mark of the image on the scanner platen. Nevertheless, the scanned image data is likely to be severely quantized in nature and, thus, such scanned images are considered to be halftoned images. All such halftone images are beneficially processed according to the systems and methods described herein.

Determining 526 respective compensated values for respective halftone pixels of the received 522 halftoned image can include using respective halftone pixel positions as an index into the predetermined 518 compensating TRC to access a modification value for the respective halftone pixel position. For instance, the modification value is combined (e.g., by addition or subtraction) with the value of the respective pixel to generate a respective combined value. The combined value may be considered the compensated value. For instance, the combined value is used in a quantization process such as a rehalftoning or a rescreening process. For example, the combined value is compared to one or more threshold values associated with a halftone screen. Marking decisions are made based on results of the comparisons. The marking decisions result in a rebinarization of the image. Alternatively, some form of filtering, such as low pass filtering or descreening, may be applied to the combined values before quantization.

Alternatively, the combined value is an intermediate value used in an error diffusion process. For example, an error diffusion process includes selecting a processing path across an intermediate version of the image, selecting a diffusion mask or set of diffusion masks based on the selected processing path, receiving the combined value from the intermediate version of the image, selecting a binarization threshold, comparing the binarization threshold to the combined value of the pixel, making the marking decision based on the results of the comparison, calculating an error value based on the pixel value and the marking decision and diffusing error to neighboring pixels with the diffusion mask based on the calculated error.

Selecting a processing path across the image includes, for example, choosing from among a set of space filling curves, a most suitable or convenient space filling curve, based, for example, on a characteristic of the image to be processed or desired rendering output. The set of space filling curves may include, for example, a simple raster scan, such as a repeating left to right or side to side scan, which typically begins at the top of an image and progressively scans a line from a first side to a second side and then drops to the next line and scans that line in the same first side to second side manner. Additionally, the set of space filling curves may include more complicated scanning paths that follow, for example, serpentine raster scans, Hilbert or Peano curves or other fractal-type patterns.

The selection of a processing path can influence a diffusion mask selection. A diffusion mask defines a neighborhood of pixels for receiving diffusion error. For example, a current pixel of interest is associated with neighboring pixels by the diffusion mask. It is preferred that the pixels that receive error be unprocessed pixels. Therefore, a diffusion mask is preferably selected to encompass only pixels that are yet to be processed. If a simple left to right scanning path is chosen, then the diffusion mask can simply encompass pixels to the right and below the current pixel of interest. If a serpentine path is chosen, then the relative location of unprocessed pixels to the current pixel of interest depends on the location of the current pixel of interest. Sometimes the unprocessed pixels are to the right of the current pixel and sometimes the unprocessed pixels are to the left of the current pixel. In this case, it may be preferable to select two diffusion masks, a first mask for use when processing moves toward the right, and, a second mask for when processing moves toward the left. When Hilbert, Peano or other space filling curves are used as processing paths, a plurality of diffusion masks may be required, one for each possible path direction. Alternatively, a single diffusion mask with a shape that generally surrounds the current pixel of interest, may be chosen (for example, for use with Hilbert, Peano and other fractal-based space filling curves). In this case, as processing meanders around the image, previously processed pixels are treated as ineligible to receive error even though they may fall within the error encompassed by the diffusion mask.

Selecting a binarization (or quantization) threshold can be as simple as determining a threshold value for the entire image, such as, for example, a threshold value of 128 (in 8-bit systems). Alternatively, a dither matrix or halftone screen can be selected to provide a threshold for a pixel based on the pixel location of the current pixel of interest. A threshold value is then selected from the dither matrix or halftone screen based on the location of the pixel.

While error diffusion is described here in terms of modifying pixel values, it is considered equivalent or nearly equivalent to instead modify threshold values of thresholds that are related to pixels within the diffusion mask. For example, where error diffusion is described in terms of adding an error-related value to a pixel value of a particular pixel, it is equivalent, or nearly equivalent, to subtract the error-related value from a threshold associated with a particular pixel. Therefore, selecting a threshold may include selecting a threshold that has been modified by error diffused from one or more previously processed pixels.

Comparing the binarization or quantization threshold to the combined value associated with the current pixel of interest typically involves a relational operation, such as, a < or > comparison or a subtraction operation between the binarization threshold and the pixel value in order to determine which of the threshold and pixel value is larger. However, other sorts of comparisons may also be used. For example, one of the combined pixel value and the threshold may be modified by a weighting or scaling factor before the comparison is made. The scaling factor is, for example, a means for lightening or darkening the image.

Making the marking decision based on the results of the comparison includes deciding to place a mark when the combined value exceeds the threshold and deciding not to place a mark when the combined value does not exceed the threshold. Alternatively, the sense of the marking decision may be reversed. The marking decision may result in a mark being placed on a print medium, such as a sheet of paper or vellum. Alternatively, the marking decision may be simply recorded in an image memory, or in an electronic storage device of an image processing system, or transmitted to another device, for example, by a computer network.

We use the phrase—making a marking decision—here because these processes are most often used in conjunction with marking devices and binary marking devices in particular. However, "making a marking decision" should also be interpreted broadly to include "making a quantization decision." These methods can be used, for example, to prepare images for efficient data transmission, or for rendering on a device with more than two quantization levels (e.g., high addressability).

Calculating an error value based on the combined value and the marking decision can be as simple as subtracting a value related to the marking decision from the pixel value. For example, where an 8-bit or 9-bit value is used to represent the combined value, and where black is represented by the value 255 and white is represented by the value 0, a combined pixel value of 200 and a threshold of 128 would lead to a decision to place a black mark. However, the black mark is related to a pixel value of 255. Therefore, the mark would be 55 counts too dark and there is a darkness (or lightness) error of 55. Subtracting the value related to the marking decision (e.g., 255) from the pixel value (200) leads to a calculated error of −55. This error or error value, or an error value based on this error, can be diffused to one or more neighboring pixels in an effort to lighten the neighboring pixels, thereby compensating for the overly dark marking decision made for the current pixel. The value associated with the black mark (e.g., 255) may be considered to be the respective compensated value determined 526 for the respective halftone pixel of interest.

Error may be diffused to neighboring pixels under any number of schemes. For example, the selected diffusion mask may indicate an order of preference for error distribution. All the error may be given or combined with a first neighboring pixel as long as the value of the neighboring pixel would not exceed a threshold. If the neighboring pixel would exceed a threshold value, then remaining error may be diffused to a second, third or fourth pixel needed. Alternatively, the diffusion mask may indicate that error should be distributed on a percentage basis. For example, 50% of the error may be distributed to a first pixel, 25% of the error may be distributed to a second pixel, with the remaining error being distributed similarly among other pixels in the mask.

However, some error diffusion techniques can produce images with excessive fragmentation of dots. In at least some environments, such as, for example, some electrophotographic environments, dot or spot fragmentation is to be avoided. Compact dots are more forgiving of non-linearities and process drifts associated with reprographic devices than are tiny dot fragments associated with a diffuse fragmentary dot. For example, a small dimensional offset in the size of a tiny dot fragment represents a larger dot gain error than does the same dimensional offsets applied to a large compact dot. Dot gain errors are perceived as errors in lightness or darkness of an image or portions of an image.

Rank Ordered Error Diffusion does not suffer from these problems. In Rank Ordered Error Diffusion, diffusing error to neighboring pixels within the diffusion mask includes sorting or ranking neighboring pixels within the selected diffusion mask according to pixel values of the neighboring pixels and distributing the calculated error (or a value that is a function of the calculated error) based on the pixels standing within that sorting or ranking. This distribution or diffusion can be carried out in a wide variety of ways.

In a first embodiment, if the error is positive, then the error is transferred to the highest valued neighboring pixel that has not yet received an error distribution. The error is transferred up to a maximum value. For example, in a system where an 8-bit value is used to represent gray levels ranging from 0 to 255, 255 may be a maximum value allowed for a pixel. In such a system, where a calculated error is, for example, 100 and the first ranked pixel, or pixel with the highest value, has a pixel value of 220, 35 counts of the calculated error value are transferred to the first ranked pixel. At the end of the operation, the calculated error value is lowered to 65 and the pixel value of the first ranked pixel is raised to the maximum of 255. If, as in the example above, error remains to be diffused or distributed, processing proceeds to an eligible pixel check. In the eligible pixel check, a determination is made as to whether there are additional neighboring pixels available to receive error. If additional error and additional pixels are available, processing returns to transferring positive error to the next highest ranked pixel. If all the error has been diffused, or if there are no more eligible pixels available, processing returns to determining 526 a respective compensated value for a next pixel. That determination 526 may be based on the combination of the modification value associated with the pixel location of the next pixel determined from the predetermined 518 compensating TRC based on the respective halftone pixel location of the next pixel and any error diffused to the next pixel from one or more previously processed pixels.

If the error is negative, then the error is transferred to the lowest valued neighboring pixel that has not yet received an error distribution. The error is transferred up to a minimum pixel value. For example, 0 may be a minimum value allowed for a pixel. In such a system, where a calculated error is, for example, −100, and the last ranked pixel or pixel with the lowest value has a pixel value of 20, −20 counts of the calculated error are transferred to the last ranked pixel. At the end of the operation, the calculated error value is raised to −80 and the pixel value of the last ranked pixel is lowered to the minimum value of 0.

Setting the value of the current pixel of interest to the minimum value allowed (e.g., 0) may be considered to be determining 526 the respective compensated value for the current respective halftone pixel.

If, as in the example above, error remains to be diffused or distributed, processing proceeds to an eligible pixel check. In the eligible pixel check, a determination is made as to whether there are additional neighboring pixels available to receive error. If additional error exists and additional pixels are available, processing returns to transferring negative error to the lowest ranked pixel. If all the error has been diffused or if there are no more eligible pixels available, processing returns to determining 526 respective compensated values for the next pixel to be processed.

In a second version of Rank Ordered Error Diffusion, all positive error from the combined value is passed to the highest ranked pixel in the diffusion mask. All negative error from the combined pixel value is transferred to the lowest ranked pixel among the neighboring pixels in the diffusion mask. This may cause the pixel value of the neighboring pixels to exceed the high threshold (e.g., 255) or to be below the minimum threshold (e.g., 0). However, this problem is remedied when the neighboring pixel itself is processed.

In a third version of Rank Ordered Error Diffusion, the ranked pixels may be assigned diffusions weights. For example, for positive error, the first ranked pixel may be assigned a weight of 50%, the second ranked pixel may be assigned a weight of 32% and a third ranked pixel may be assigned a diffusion weight of 18%. For negative errors, the weighting might be reversed. That is, the last or lowest ranked pixel may be assigned a negative diffusion weight of 0.5. The next lowest ranked pixel may be assigned a diffusion weight of 0.32 and the third lowest ranked pixel may be assigned a diffusion weight of 0.18. Error is diffused from the current pixel of interest to the neighboring pixels according to these weights. Again, this may mean that the value of the neighboring pixels is made to exceed maximum or minimum thresholds. However, this problem is remedied when the neighboring pixels themselves are processed.

A fourth version of Rank Ordered Error Diffusion is similar to the third version, except that error that would place the value a neighboring pixel beyond a maximum or minimum threshold (e.g., 255, 0) is simply discarded.

In a fifth version of Rank Ordered Error Diffusion, when the neighboring pixels are ranked, they are ranked with weighting factors that are dependent upon the spatial locations of the neighboring pixels relative to the current pixel of interest. For example, pixels that are closer to the current pixel of interest are given higher spatial weights than pixels that are farther away. This spatial weighting can be additive or multiplicative.

Clearly, aspects of these various versions of Rank Ordered Error Diffusion can be combined to create additional versions. For example, the spatial weighting of the fifth embodiment may be combined with the discarding of excess error of the fourth version to create yet another version.

The method 510 for compensating for a spatial non-uniformity in an image rendering device is applicable where it is appropriate to provide compensation based solely on pixel position. For example, the method 510 is appropriately applied where spatial non-uniformity is not a strong function of pixel value. Additionally, the method 510 is appropriately applied where some compensation is desired, but where the expense of more complete compensation is not warranted. However, some applications may call for additional compensation accuracy.

Figure 6:
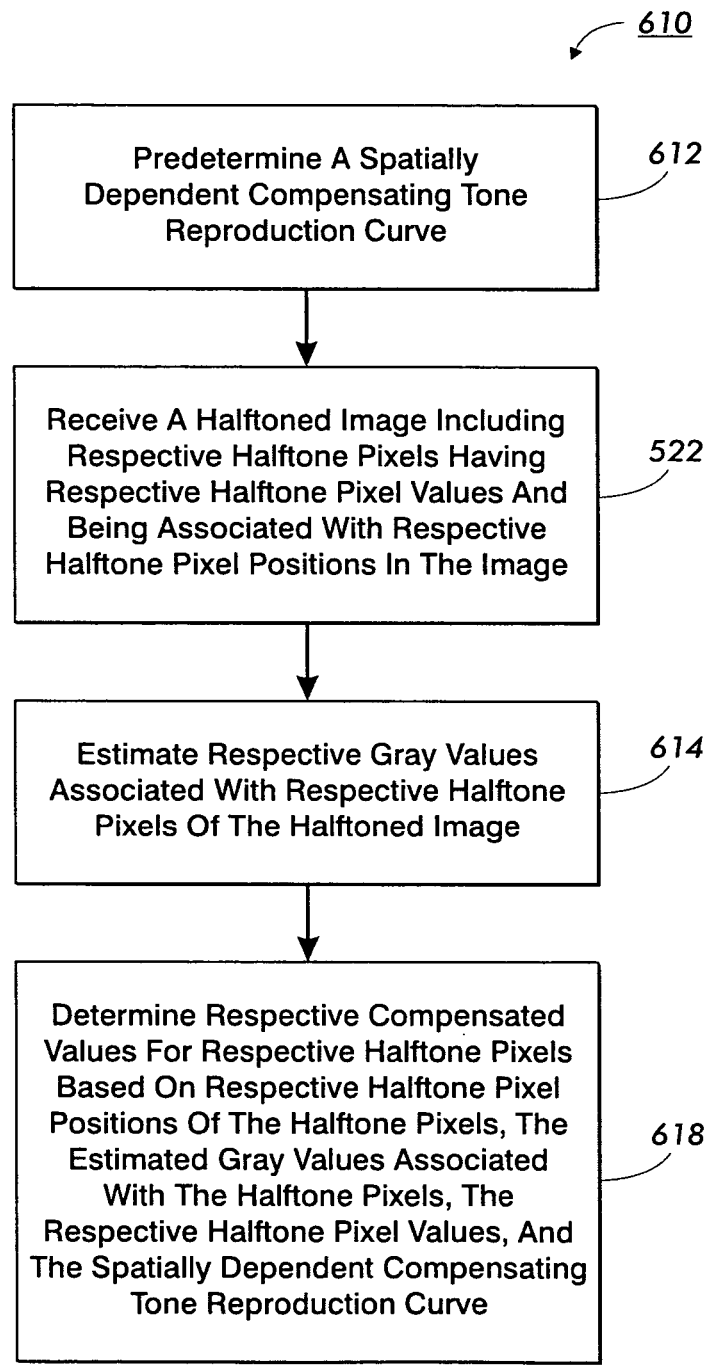
FIG. 6 is a flow chart outlining a second or enhanced method for compensating for non-uniformities in an image rendering system.

Referring to FIG. 6, a second method 610 for compensating for a spatial non-uniformity in an image rendering device includes predetermining 612 a spatially dependent compensating TRC, receiving 522 a halftone image including respective halftone pixels having respective halftone pixel values associated with respective halftone pixel positions in the image, estimating 614 respective gray values associated with respective halftone pixels of the halftone image and determining 618 respective compensated values for respective halftone pixels based on respective halftone pixel positions of the halftone pixels, the estimated gray values associated with the halftone pixels, the respective halftone pixel values of the received 522 halftone image and the spatially dependent compensating TRC.

In the second method 610, modification values are a function of both halftone pixel position and the estimated 614 respective gray values associated with the respective halftone pixels. Therefore, the spatially dependent compensating TRC is predetermined 612 on the basis of both pixel position and pixel value. For example, as suggested in reference to FIG. 1 and FIG. 2, a plurality of level-slope targets (similar to FIG. 1) are rendered by the marking engine or marking engines of interest. A plurality of spatially dependent ERCs (e.g., 224-232) is determined for a respective plurality of desired shades of gray or contone values (e.g. 214-222). In an exemplary experimental system, 32 different gray level uniform patches are rendered to determine a set of spatially dependent ERCs. The spatially dependent ERCs are used to predetermine 612 the compensating TRC.

Figure 4:
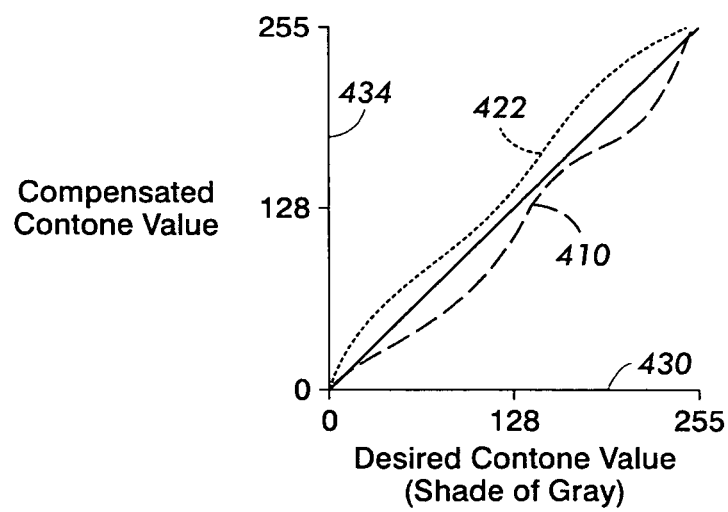
FIG. 4 is a plot of Tone Reproductions Curves that might be used to compensate for variations from the ideal in the Engine Response Curves of FIG. 3.

For example, the measured ERCS, combined with knowledge of the rendering system, is used to calculate or determine 612 the compensating TRC. For instance, with reference to FIG. 4, at each pixel position of interest, a relationship is determined (e.g., 410, 422) between a desired (e.g., 430) contone value or shade of gray and a compensated contone value 434. While, for example, only 32 shades of gray may be investigated by generating and sensing aspects of 32 uniform patch targets, those shades of gray or uniform patch targets are spread throughout the entire available contone range (e.g., 0-255). Interpolation techniques may be applied to determine compensated contone values (e.g., 434) for those desired contone values not explicitly studied.

Additionally, or alternatively, determining 612 the compensating TRC may include iteratively refining modification values or compensated contone values associated therewith. For example, for each position in each measured engine response curve, a modification value or an attenuated modification value is determined and applied to the associated pixel in the associated halftoned version of the associated uniform patch target. New uniform patch targets are generated according to the modified data. The sensor examines the rendered new uniform patch targets and related engine response data or curves are generated. Differences between the uncompensated ERCs originally generated and this first set of partially compensated ERCs are used to determine updated modification values. This process is repeated until the compensated ERCs are within a desired tolerance of an ideal.

The determined 612 compensating TRC may be in the form of a plurality of position specific TRCs relating desired contone values or shades of gray to modification values. For example, where the second method 610 for compensating for non-uniformity in an image rendering device is to be applied to streak compensation in a marking engine having a resolution of 600 spots per inch and a cross-process dimension of 11 inches, 6600 row or column specific compensation curves may be generated (one for each spot, column or row in the cross process direction). In compensating halftoned image data, location information regarding a halftoned pixel from the image (i.e., a column or row identification) is used to select the appropriate TRC. An estimated 614 respective gray value associated with the pixel is used as an index into the TRC to determine the modification value.

For example, a pixel having a pixel position located in a first column may address a first TRC 714. A pixel having a pixel location in a second column may address a second TRC 716. Pixels in the third column may find modification values in a third TRC 718, while a pixel in the last column of the halftoned image may address a $6600^{th}$ TRC 720. The determined 612 compensating TRC would include the entire set of 6600 column-specific TRCs.

Figure 7:
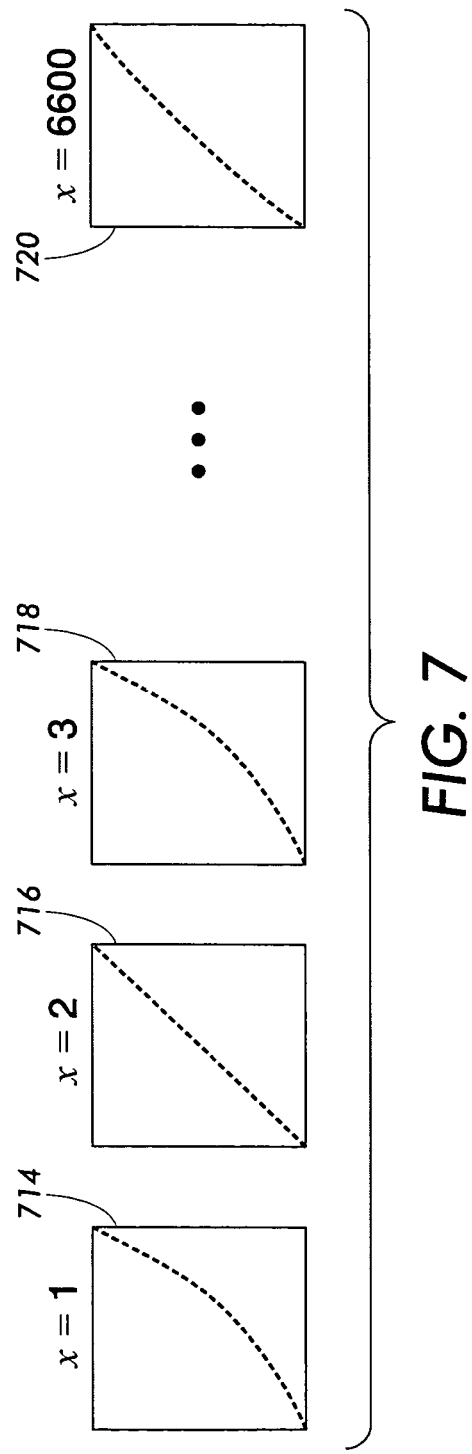
FIG. 7 illustrates a compensating Tone Reproduction Curve including a set of position specific TRCs.
Figure 8:
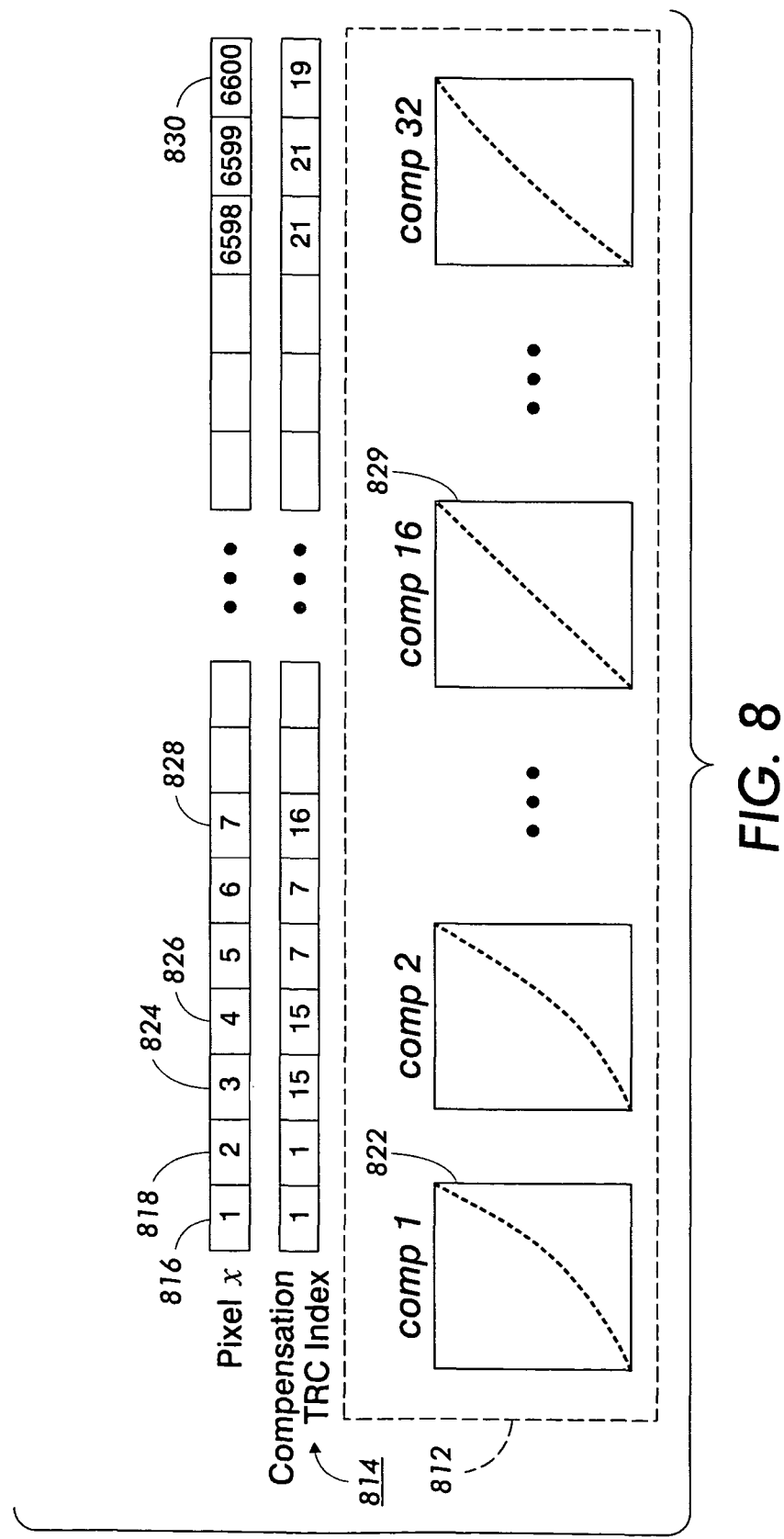
FIG. 8 illustrates a compensating Tone Reproduction Curve including a reduced set of TRCs and an indexing lookup table for selecting an appropriate member of the reduced set based on a position of a pixel of interest.

In some systems, the memory requirements to store the 6600 column-specific TRCs (e.g., in the form of look-up tables) might be impractical. Therefore, in some embodiments, determining 612 the compensating TRC includes determining a reduced set of TRCs. For example, the 6600 TRCs of FIG. 7 are analyzed. Representative TRCs are selected to represent pluralities of similar TRCs. In exemplary experimental systems, the 6600 TRCs are successfully represented by a set 812 of 32 TRCs. An indexing look-up table 814 is used to indicate which of the members of the reduced set include modification values for each of the 6600 halftone pixel column positions. For instance, the indexing look-up table 814 indicates at 816 and 818 that pixels in both the first column and second column of the halftoned image space are properly compensated by a first reduced set TRC 822. At 824 and 826, the exemplary indexing look-up table 814 indicates that pixels associated with the third and fourth columns are properly compensated by a fifteenth reduced set TRC (not shown). Similarly, the exemplary indexing look-up table 814 indicates that pixels in the seventh column 828 are properly compensated by a sixteenth reduced set TRC and that pixels in the 6600 column 830 are properly compensated by the nineteenth reduced set TRC (not shown). In these embodiments, determining 612 the compensating TRC includes determining a reduced set (e.g., 812) of TRCs and the associated indexing entries of an indexing look-up table (e.g., 814) or equivalence thereof.

Predetermining 612 the spatially dependent compensating TRC can include other TRC reduction techniques. For example, the compensating data for a printing system, such as the data illustrated in FIG. 7, can be compressed or approximated and even filtered through mathematical basis decomposition techniques. These techniques can be applied to ERC data or compensating TRC data. When they are applied to ERC data, compensating TRC data can be derived from the resulting ERC basis equations, just as the compensating TRCs of, for example, FIG. 7, might be generated from uncompensated ERC data.

For clarity, mathematical basis decomposition will be described in terms of compensating TRCs. However, it is to be understood that the techniques can be applied equally well to ERC data.

Mathematical basis decomposition techniques include, but are not limited to, Discreet Cosine Transformation (DCT), Singular Value Decomposition (SVD) and Principal Component Analysis (PCA). Each of these techniques compress or approximate their input data in terms of orthogonal basis vectors. However, mathematical basis decomposition techniques that do not generate orthogonal bases vectors may also be applicable. As the name implies, Discreet Cosine Transformation is based on basis vectors that are not data dependent. Singular Value Decomposition and Principal Component Analysis result in basis vectors that are data dependent.

Referring to FIGS. 9-12, an exemplary embodiment uses Singular Value Decomposition to reduce or approximate the compensating information (e.g., FIG. 7) of an image rendering system. The processes of Singular Value Decomposition are readily carried out in the form of matrix manipulations. Therefore, as shown in FIG. 9, compensating TRC data (e.g., FIG. 7) (or ERC data) is presented as entries in a matrix Y 910. The columns of the matrix 910 are associated with pixel positions. For example, where the second method 610 is applied to streak compensation, the columns of the matrix 910 are associated with respective columns in the cross-process direction. The rows in the matrices are associated with desired shades of gray or contone values. The values of the elements in the matrix include compensation information associated with their respective rendered image space column and desired shade of gray or contone value. For example, the elements include output contone values or modification values (or engine response values).

Singular Value Decomposition is based on finding a solution to the following equation:

$$Y' = USV^T \qquad \text{Equation (1)}$$

Referring to FIG. 10, Y' is the variation between a reference or mean compensating TRC 1010 and the spatially dependent TRC 910. S is an appropriately sized matrix with singular values on the diagonal. U and V are composed of eigenvectors.

Figure 11:
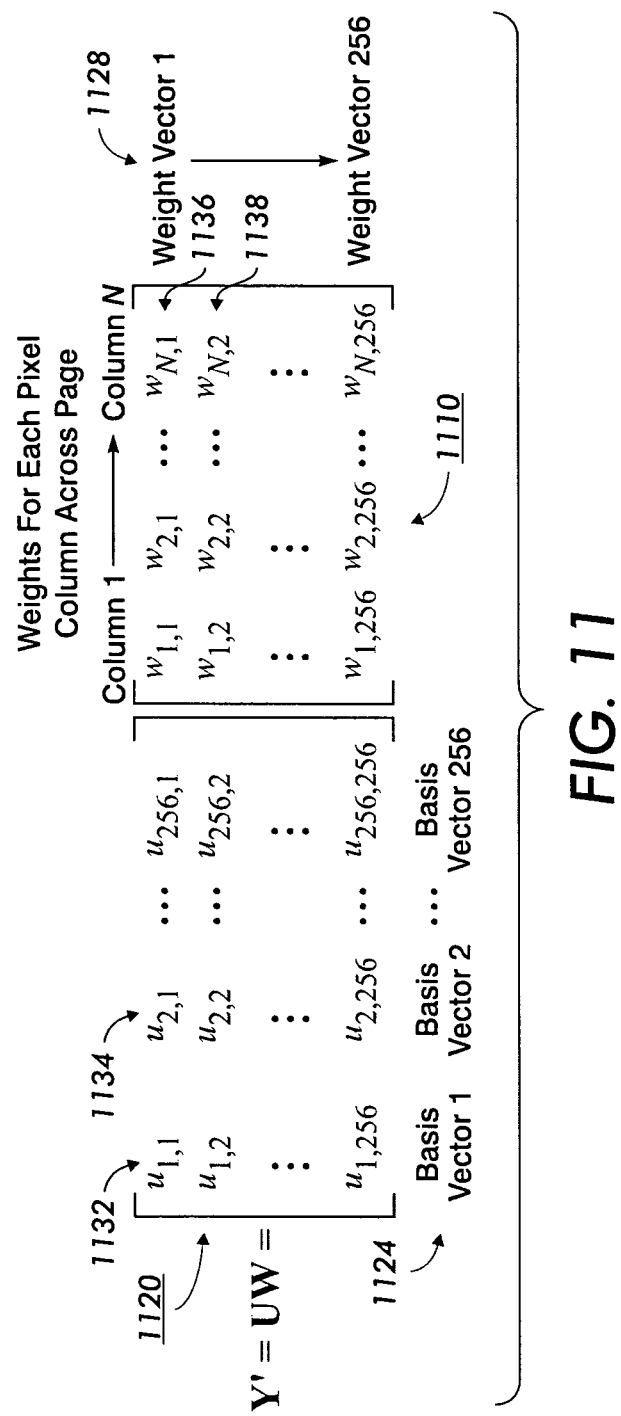
FIG. 11 illustrates a matrix equation for implementing Singular Value Decomposition.

Referring to FIG. 11, we combine V and S into a single matrix of weight vectors W (1110). The simultaneous equations represented by the SVD equation 1120 are solved to yield the basis vectors 1124 and weight vectors 1128 which together describe the variation from the reference or mean compensation curve 1010 for each pixel location and desired level of gray or contone value in the rendered image space.

An analysis of the basis vectors 1124 and the weight vectors 1128 often indicates that the vast majority of the variation is accounted for by the first few basis vectors (e.g., 1132, 1134), and the first few weight vectors (e.g., 1136, 1138). Therefore, the remainder of the basis vectors and weight vectors can be discarded.

As a result, predetermining 612 a compensating TRC can include using mathematical basis decomposition techniques such as, Singular Value Decomposition, to generate equations such as that depicted in FIG. 12 wherein significant basis values 1214, 1216 and significant basis weights 1218, 1220 and values 1224 from the average or mean compensating TRC 1010 are combined to generate spatially dependent compensating TRC values 1230.

Receiving 522 a halftoned image has been described above.

Estimating 614 respective gray values may include, for example, applying an averaging or low pass filter to pixel values of a pixel of interest and associated neighboring pixels. For example, if the received 522 image is in a binary format, the binary data is normalized, as described above, to some suitable values such as, for example, 0 and 255. An averaging or filtering window is selected, as is a pixel of interest. The window is applied to the pixel of interest. The values of pixels within the window are added together. The sum is divided by the number of pixels in the window. The result is the estimated 614 respective gray value associated with the respective halftone pixel.

Alternatively, positions within the averaging or filtering window may be associated with weights. For example, pixels near the selected pixel of interest may have a more significant contribution to the sum than do pixels toward the edge of the window. Better results are often achieved when the averaging or filtering window is selected based on knowledge of the halftone screen associated with the received 522 halftoned image. For example, imaging artifacts are reduced when the averaging or filtering window is the same size as or an integer multiple of the size of the cell size of the halftone screen.

Determining 618 respective compensated values for respective halftone pixels based on respective halftone pixel positions of the halftone pixels, the estimated 614 gray values associated with the halftone pixels, the respective halftone pixel values and the spatially dependent compensating TRC can include, for example, using the pixel position to directly select a TRC (e.g. 714, 716, 718, 720) and using the estimated 614 gray value for the respective pixel as an index or input value into the selected TRC, thereby selecting a modification value.

Alternatively, the pixel position of the respective pixel of interest is used as an index (e.g., 816-830) into an indexing look-up table (e.g., 814) which selects an appropriate TRC from a reduced set of TRCs. Again, the estimated 614 respective gray value is used as an index or input into the selected TRC.

In yet a further alternative, the pixel position and estimated 614 respective gray values are used as input (e.g., 1240, 1244) into an equation or system of equations resulting from a mathematical basis decomposition of engine response or compensation information.

Whatever form the predetermined 612 spatially dependent compensating TRC takes, the estimated 614 respective gray value and the pixel position of the respective pixel of interest are used to retrieve or generate a modification value. The modification value is combined with the original pixel value from the received 522 halftoned image or a normalized version thereof.

Determining 618 respective compensated values may include requantizing the modified data. For example, the combined value may be processed through thresholding associated with a halftone screen. Alternatively, as described above, the combined value may be quantized through an error diffusion process. In that case, the modification value may be combined, not only with the value of the respective pixel from the received 522 halftoned image, but may also be combined with diffused error from a previously processed pixel. Also, as explained above, quantizing through the process of Rank Ordered Error Diffusion, beneficially produces quantized data resulting in well clustered dots, which can be an advantage over other error diffusion processes.

Figure 13:
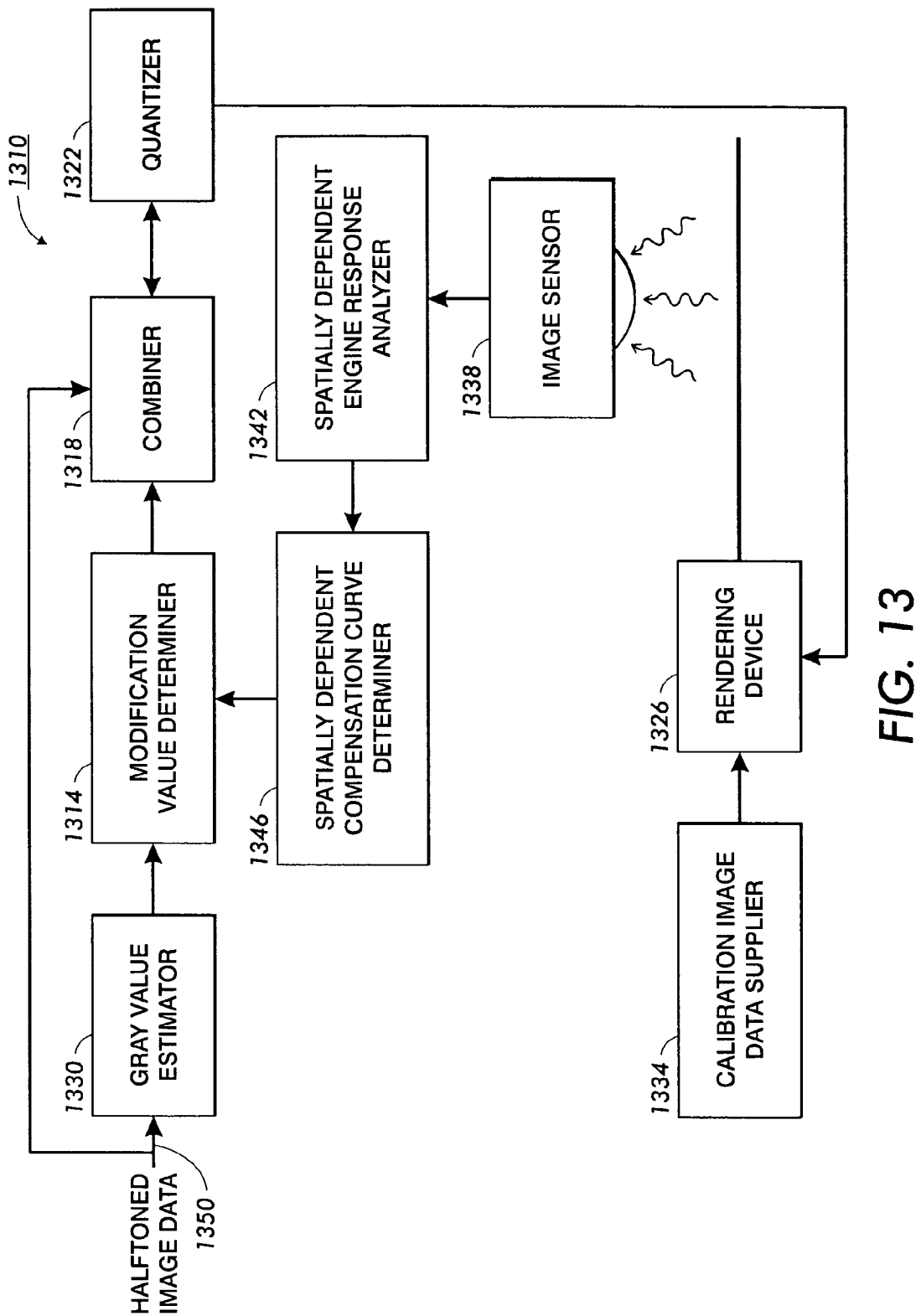
FIG. 13 is a block diagram of a system that can perform the methods of FIG. 5 and/or FIG. 6.

Referring to FIG. 13, a system 1310 for compensating a halftoned image for non-uniformity in an image rendering device according to the first method 510 includes a modification value determiner 1314, a combiner 1318 and a quantizer 1322. The system 1310 is at least associated with a rendering device 1326 in that the system 1310 at least includes information with regard to non-uniformities of the rendering device 1326. The system 1310 may be further adapted to compensate a halftoned image for non-uniformities in the rendering device 1326 through the inclusion of a gray value estimator 1330. The system 1310, with or without the gray value estimator 1330, may also include a calibration image data supplier 1334, an image sensor 1338, a spatially dependent engine response analyzer 1342 and a spatially dependent compensation curve determiner 1346.

When the system 1310 is operating under the first method 510, the modification value determiner 1314 includes a spatially dependent compensation TRC predetermined 518 according to the methods described in reference to FIG. 5. That is, the predetermined 518 compensating TRC includes a single modification value for each position of interest in the rendered image space.

If the system 1310 is adapted to perform the second compensation method 610, then the modification value determiner 1314 includes a compensating TRC predetermined 612 according to the methods described in reference to FIG. 6. That is, the compensating TRC may be predetermined 612 to be a set of TRCs, wherein each member of the set is associated with a specific portion of the rendered image space (e.g., FIG. 7). Alternatively, the compensating TRC may be predetermined 612 to be a reduced set (e.g., 812) of TRCs wherein members (e.g., 822, 829) of the set are used to compensate respective halftone pixels associated with a plurality of portions of the rendered image space.

In yet a further alternative, the compensating TRC may be predetermined to be in the form of an equation (e.g., FIG. 12) resulting from a mathematical decomposition of engine response or compensating tone reproduction data. For example, the equations may be the result of Discreet Cosine Transformations, Singular Value Decomposition and/or Principal Component Analysis.

Whether the system 1310 is adapted for performing the first method 510 or the second method 610 or both, the compensation TRC associated with the modification value determiner 1314 may be installed during manufacture and be based on measurements and calculations performed by external equipment. Alternatively, the compensating TRC associated with the modification value determiner 1314 may be based on calibration images (e.g., FIG. 1), generated by the rendering device 1326, based on calibration image data supplied by the calibration image data supplier 1334, that are sensed by the image sensor 1338 and processed by the spatially dependent engine response analyzer and/or the spatially dependent compensation curve determiner 1346.

The combiner 1318 receives a modification value from the modification value determiner 1314, as well as respective pixel value information from a received 522 halftoned image 1350. For example, if performing the first compensation method 510, the modification value determiner 1314 receives the halftoned image data 1350 and selects a pixel for processing. The position of the selected pixel is used as an index or an input for accessing a modification value from the compensating TRC. The modification value is delivered to the combiner 1318.

Alternatively, if the system 1310 is performing the second method 610 for compensating a halftoned image, the gray value estimator 1330 receives the halftoned image data and selects a pixel for processing. If need be, the image data is normalized as described above. The gray value estimator 1330 applies an averaging or low pass filter to a portion of the image data in close proximity to the selected pixel and a respective estimated 614 gray value is output from the filter. Pixel position information along with the estimated 614 gray value are delivered to the modification value determiner 1314. The modification value determiner 1314 uses the pixel location information and the estimated 614 gray value to access or calculate a modification value. Again, the modification value is delivered to the combiner 1318.

The combiner 1318 also receives respective pixel value information from the received halftoned image data 1350. If necessary, the data is normalized as described above. The combiner combines the respective pixel value data with the received modification value. For example, the values are added together. If the quantizer 1320 quantizes received image data according to an error diffusion technique, the combiner 1318 may also receive diffused error for the respective pixel location. Therefore, the combiner may also combine the diffused error with the pixel value and the modification value. In any event, the combiner 1318 produces a combined value and delivers it to the quantizer 1322.

The quantizer 1322 performs any appropriate quantizing method to requantize the halftoned image data. For example, the quantizer may perform a thresholding operation according to a halftone screen. Alternatively, the quantizer 1322 applies an error diffusion technique to the combined value. In that case, the quantizer 322 may notify the combiner 318 of diffused error and the combiner 318 and the quantizer 322 work together to distribute the diffused error to appropriate unprocessed pixels. For instance, the quantizer 1322 may quantize the image data by performing Rank Ordered Error Diffusion, which beneficially produces clustered dots.

The output of the quantizer may be delivered directly to the rendering device 1326. Alternatively, the output from the quantizer 1322 may be stored for later transmission to a rendering device or may be transmitted over a network, such as, for example, the Internet, to some remote rendering device. In this regard, the image sensor 1338 may also be located remotely. Additionally, the spatially dependent response analyzer 1342 and/or the spatially dependent compensation curve determiner 1346 may also be located remotely. In that case, the modification value determiner may receive the appropriate predetermined 518, 612 compensating TRC via a network connection (not shown) or through some other communications means such as, for example, magnetic media or electronic memory device.

A controller (not shown) may orchestrate the activities of the modification value determiner 1314, the combiner 1318, the quantizer 1322 and if included, the gray value estimator 1330. Additionally, the controller (not shown) may orchestrate the delivery of calibration image data from the calibration image data supplier 1334 to the rendering device 1336, orchestrate the sensing of image data by the image sensor 1338, and the generation of spatially dependent engine response curves by the spatially dependent engine response analyzer 1342 and/or the determination of spatially dependent compensation curve information by the spatially dependent compensation curve determiner 1346.

For example, the controller (not shown) may orchestrate the iterative generation of uncompensated and then compensated calibration image data and the delivery of the image data to the rendering device until measurements made by the image sensor 1338 indicate that the compensation or modification values arrived at by the spatially dependent compensation curve determiner 1346 appropriately compensate for non-uniformities in the rendering device 1326.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method for compensating for a spatial non-uniformity in an image rendering device, the method comprising:
    predetermining a spatially dependent compensating tone reproduction curve for the rendering device;
    receiving a halftoned image including a plurality of respective halftone pixels having respective halftone pixel values, the respective halftone pixels being associated with respective halftone pixel positions in the image; and
    determining respective compensated values for the respective halftone pixels based on the respective halftone pixel positions, the spatially dependent compensating tone reproduction curve and associated respective halftone pixel values.

2. The method of claim 1 further comprising:
    estimating respective gray values associated with the respective halftone pixels;
    and wherein determining respective compensated values for the respective halftone pixels comprises:
    determining the respective compensated values for the respective halftone pixels based on the respective halftone pixel positions, the respective estimated gray values, the spatially dependent compensating tone reproduction curve and the respective halftone pixel values.

3. The method of claim 1 wherein predetermining the spatially dependent compensating tone reproduction curve comprises:
    rendering a calibration image with the image rendering device;
    measuring an aspect of the calibration image; and
    analyzing the measured aspect of the image for spatial variation information, thereby generating spatial variation analysis information;
    generating the spatially dependent engine response curve from the spatial variation analysis information.

4. The method of claim 3 wherein predetermining a spatially dependent compensating tone reproduction curve based on the spatially dependent engine response curve comprises:
    generating an intermediate spatially dependent compensating tone reproduction curve to compensate for a portion of spatial variation determined to exist by the analysis;

iteratively:
  rendering a new calibration image that is compensated with information from the intermediate spatially dependent compensating tone reproduction curve;
  measuring the aspect of the new calibration image;
  analyzing the measured aspect of the new image for remaining spatial variation information; and
  updating the intermediate spatially dependent compensating tone reproduction curve anticipated to compensate for an additional portion of remaining spatial variation determined to exist by the analysis of the new image, until the remaining spatial variation determined to exist by the analysis of the new image is below a predetermined threshold variation amount, thereby arriving at a last version of the intermediate spatially dependent compensating tone reproduction curve; and
  selecting the last version of the intermediate spatially dependent compensating tone reproduction curve to be the predetermined spatially dependent compensating tone reproduction curve.

5. The method of claim 2 wherein estimating the respective gray values associated with the respective halftone pixels comprises:
  applying an averaging filter, at least approximately centered on the respective halftone pixels to an area around the respective halftone pixels; and
  selecting respective outputs of the averaging filter as the respective estimated gray values associated with the respective halftone pixels.

6. The method of claim 1 wherein predetermining a spatially dependent compensating tone reproduction curve comprises:
  determining a plurality of respective compensating tone reproduction curves, each of the compensating tone reproduction curves being associated with a respective set of image positions; and
  selecting the plurality of compensating tone reproduction curves to be the spatially dependent compensating tone reproduction curve.

7. The method of claim 1 wherein predetermining a spatially dependent compensating tone reproduction curve comprises:
  determining a plurality of respective compensating tone reproduction curves, each of the compensating tone reproduction curves being associated with a respective position in a cross process direction in the image rendering device; and
  selecting the plurality of respective compensating tone reproduction curves to be the spatially dependent compensating tone reproduction curve.

8. The method of claim 2 wherein predetermining a spatially dependent compensating tone reproduction curve comprises:
  determining at least one of a plurality of respective compensating tone reproduction curves, each of the compensating tone reproduction curves being associated with a respective position in a cross process direction of the image rendering device and a plurality of respective engine response curves, each of the engine response curves being associated with a respective position in a cross process direction in the image rendering device; and
  performing mathematical basis decomposition on the at least one of the plurality of respective compensating tone reproduction curves and the engine response curves, thereby determining respective basis vectors and respective vector weights representative of at least one of the plurality of respective compensating tone reproduction curves; and
  generating the spatially dependent compensating tone reproduction curve from the respective basis vectors and respective vector weights.

9. The method of claim 8 wherein performing mathematical basis decomposition comprises:
  performing at least one of discrete cosine transformation, singular value decomposition and principal component analysis.

10. The method of claims 8 wherein performing mathematical basis decomposition comprises:
  determining respective orthogonal basis vectors and respective vector weights.

11. The method of claim 1 wherein determining respective compensated values for the respective halftone pixels comprises:
  determining respective modification values for the respective halftone pixels based on the respective halftone pixel positions, and the spatially dependent compensating tone reproduction curve; and
  performing error diffusion based on the respective halftone pixel values of the received halftoned image and the respective modification values.

12. The method of claim 11 wherein performing error diffusion comprises:
  performing rank ordered error diffusion.

13. The method of claim 2 wherein determining respective compensated values for the respective halftone pixels comprises:
  determining respective modification values for the respective halftone pixels based on the respective halftone pixel positions, the respective estimated gray values, and the spatially dependent compensating tone reproduction curve; and
  performing error diffusion based on the respective halftone pixel values of the received halftoned image and the respective modification values.

14. The method of claim 13 wherein performing error diffusion comprises:
  performing rank ordered error diffusion.

15. A method for compensating for a spatial non-uniformity in an image rendering device, the method comprising:
  predetermining a spatially dependent compensating tone reproduction curve for the rendering device;
  receiving a halftoned image including a plurality of respective halftone pixels having respective halftone pixel values, the respective halftone pixels being associated with respective halftone pixel positions in the image;
  estimating respective gray values associated with respective halftone pixels; and
  determining respective compensated values for respective halftone pixels based on the respective halftone pixel positions, the respective estimated gray values, the spatially dependent compensating tone reproduction curve and the respective halftone pixel values.

16. The method of claim 15 wherein estimating the respective gray values associated with the respective halftone pixels comprises:
  applying at least one of an averaging filter and a low pass filter, at least approximately centered on the respective halftone pixels to an area around the respective halftone pixels; and selecting respective outputs of the at least one of the averaging filter and the low pass filter as the respective estimated gray values associated with the respective halftone pixels.

17. The method of claim 15 wherein predetermining a spatially dependent compensating tone reproduction curve comprises:
    determining at least one of a plurality of respective compensating tone reproduction curves, each of the compensating tone reproduction curves being associated with a respective set of positions in a rendered image space and a plurality of respective engine response curves, each of the engine response curves being associated with a respective set of positions in a rendered image space; and
    performing mathematical basis decomposition on the at least one of the plurality of respective compensating tone reproduction curves and the engine response curves, thereby determining respective basis vectors and respective vector weights representative of at least one of the plurality of respective compensating tone reproduction curves and the engine response curves; and
    generating the spatially dependent compensating tone reproduction curve from the respective basis vectors and respective vector weights.

18. The method of claim 17 wherein performing mathematical basis decomposition comprises:
    performing at least one of discrete cosine transformation, singular value decomposition and principal component analysis.

19. The method of claims 17 wherein performing mathematical basis decomposition comprises:
    determining respective orthogonal basis vectors and respective vector weights.

20. A system operative to compensate a halftoned image for spatial non-uniformity in an image rendering device, the system comprising:
    a modification value determiner that is operative to receive respective pixel position information regarding a respective pixel of a halftoned image, and determine a spatially dependent modification value from a spatially dependent compensating tone reproduction curve associated with the image rendering device based on the pixel position information;
    a combiner that is operative to receive the spatially dependent modification value from the modification value determiner, receive a respective pixel value associated with the respective pixel of the halftoned image and combine the respective pixel value associated with the respective pixel with the modification value, thereby generating a combined value; and
    a quantizer that is operative to receive the combined value from the combiner and to quantize the combined value, thereby producing a compensated halftone pixel value associated with the respective pixel position of the respective pixel of the halftoned image.

21. The system of claim 20 further comprising:
    a gray value determiner that is operative to applying at least one of an averaging filter and a low pass filter to the respective pixel value of the respective pixel and to neighboring pixels values associated with pixels neighboring the respective pixel, thereby generating a respective estimated gray value in association with the respective pixel;
    wherein the modification value determiner is operative to receive the respective pixel position information and the respective estimated gray value associated with the respective pixel of a halftoned image, and determine a spatially dependent modification value from the spatially dependent compensating tone reproduction curve associated with the image rendering device based on the pixel position information and the estimated gray value.

22. The system of claim 20 wherein the quantizer is operative to quantize the combined value by performing error diffusion based on the combined value.

23. The system of claim 22 wherein the combiner is operative to receive the spatially dependent modification value from the modification value determiner, receive the respective pixel value associated with the respective pixel of the halftoned image, receive diffusion error from the quantizer and combine the respective pixel value associated with the respective pixel with the modification value and at least some of the diffusion error, thereby generating the combined value.

24. The system of claim 22 wherein the quantizer is operative to quantize the combined value by performing rank ordered error diffusion based on the combined value.

* * * * *